United States Patent [19]

Denman et al.

[11] 4,120,167

[45] Oct. 17, 1978

[54] OFFSHORE PIPE LAYING

[76] Inventors: Lee Richard Denman, P.O. Box 52891, Houston, Tex. 77052; William Randolph Abrams, Box 312, Mystic, Conn. 06355

[21] Appl. No.: 803,888

[22] Filed: Jun. 6, 1977

[30] Foreign Application Priority Data

Jun. 17, 1976 [GB] United Kingdom ............... 25172/76

[51] Int. Cl.² ............................ F16L 1/00; G01S 9/66
[52] U.S. Cl. ............................... 405/157; 114/144 A; 340/3 R; 340/3 T; 405/166
[58] Field of Search ................. 61/107, 108, 109, 110, 61/111; 340/3 R, 3 T; 114/144

[56] References Cited
U.S. PATENT DOCUMENTS

| 3,668,878 | 6/1972 | Jones et al. | 61/108 |
| 3,922,632 | 11/1975 | Murphree | 340/3 R |
| 3,953,827 | 4/1976 | LeMoal | 340/3 T |

Primary Examiner—Jacob Shapiro
Attorney, Agent, or Firm—LeBlanc & Shur

[57] ABSTRACT

The forward movement of a pipe-laying vessel when laying pipe offshore is controlled to maintain the position of the pipe as laid on the sea bed as close as possible to the desired track. The position of the touch down point on the sea bed of the pipeline suspended from the vessel is measured at periodic intervals by driving a survey vessel fitted with an echo location device along the already laid line. The measured position of a touch down point is compared with the desired track and any deviation is computed. Further movements of the pipe-laying vessel are adapted to minimize this deviation.

10 Claims, 3 Drawing Figures

OFFSHORE PIPE LAYING

This invention relates to offshore pipe-laying.

It is known to lay a pipeline on the sea bed by means of a pipe-laying barge which may have a stern ramp or stinger for guiding and supporting the pipe towards the sea bed. In normal practice the pipe-laying barge is driven approximately along the predetermined path of the pipeline on the sea bed. Typically, this path is in a predetermined "right-of-way", which is a track of finite width within which the pipline must be laid. Owing to the effect of weather and marine currents, the touch-down point, that is to say the locus of the point at which newly laid pipeline touches the sea bed varies from the predetermined path even if the pipe-laying barge is driven with great precision over the predetermined path, and can deviate outside the right-of-way.

The pipe-laying barge would normally contain navigational aids and associated computing apparatus by means of which the absolute position of the barge and its position relative to the predetermined track can be determined. The computing apparatus would normally be capable of controlling the movements of the barge, which would normally be continuously anchored and moved by winches. The particular form of the navigational aid and the construction and arrangement of the computing apparatus is not of consequence provided that they are sufficiently accurate. Apparatus suitable for the purpose is known and commercially available.

An automatic pilot by means of which a vessel may be navigated along a path with a deviation in course of, for example, less than one tenth of a degree from the direction of the desired course at any point is known and is commercially available. Also known and commercially available is an echo sounder by means of which the point at which an underwater pipe touches the sea bed and the position of that point relative to a vessel incorporating the echo sounder can be determined. According to the invention, there is provided a method of laying pipeline offshore, comprising driving a pipe-laying barge along a predetermined right-of-way, feeding a continuous length of pipe from the barge to the underlying marine bottom so that the pipe is laid approximately along a predetermined path in the right-of-way, driving a vessel substantially over and along the track of the pipe as laid, ascertaining, by means of an echo sounder, the position of the touch-down point of the pipeline, computing the lateral deviation of the touch-down point from the predetermined path, and controlling the lateral displacement of the pipe-laying barge in accordance with the computed deviation of the touch-down point from the path so as to reduce the aforementioned deviation.

According to another aspect of the invention, there is provided an offshore pipe-laying system comprising a pipe-laying barge including a system of anchors, a system of winches, and an automatic control apparatus for controlling the operation of the winches in accordance with input data so as to propel the barge; means for storing an indication of a predetermined path in the right-of-way for a pipeline; a vessel which includes means capable of guiding the vessel along a course; an echo sounder on this vessel, the echo sounder being arranged to ascertain the touch-down point of the pipeline; an automatic computing apparatus which is arranged to obtain an indication of the deviation of the touch-down point as detected by the echo sounder from the predetermined path and to control the automatic width control apparatus of the pipe-laying barge to reduce the aforementioned deviation.

It will be understood that normally the pipelaying barge includes a navigational aid which is capable of providing, after appropriate data processing if necessary, an exact indication of the geographical coordinates of the pipe-laying barge. The indication of the predetermined path in the right-of-way may consist of a storage of a multiplicity of geographical locations which the path traverses but may be in any convenient form to suit the circumstances. The vessel, which is termed for convenience "survey vessel" will normally include a navigational aid by means of which its exact geographical coordinates can be found so as to enable the exact computation of the touchdown point.

It will be seen therefore that the method and apparatus proposed by the present invention afford the possibility of achieving a more accurate laying of the pipeline. Instead of driving the pipe-laying vessel as accurately as possible along the intended path of the pipeline and trusting that the deviation of the touch-down point from the path will not under normal conditions be excessive, the lateral displacement of the pipe-laying vessel from the path can be controlled so as to take into account automatically the prevailing marine conditions.

There follows a description of one way in which the present invention may be put into effect. Reference will be made hereinafter to the accompanying drawings, of which:

Figure 1:
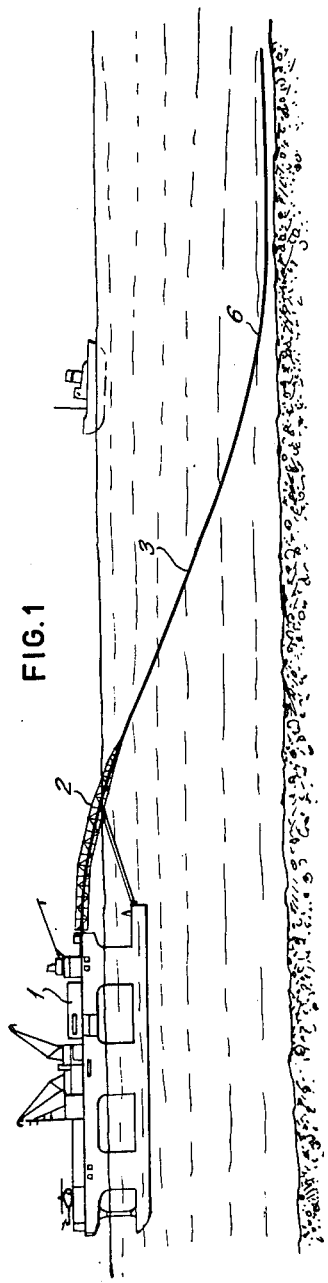
FIG. 1 is a schematic illustration of a pipe-laying barge and an accompanying survey vessel.

FIG. 1 illustrates in schematic form a pipe-laying operation. A pipe-laying barge 1, which is preferably a semi-submersible barge, has a stern ramp 2 by means of which pipe is fed to the seabed 4. In accordance with known practice, the semi-submersible barge may be secured at any time by a plurality of anchors and is preferably moved so as to alter its geographical position by means of winches (not shown). FIG. 1 shows also a survey vessel 5 which is, according to one example of the invention, kept in station approximately over the touch-down point 6, namely the place at which the leading part of the pipe first touches the sea bottom.

Figure 2:
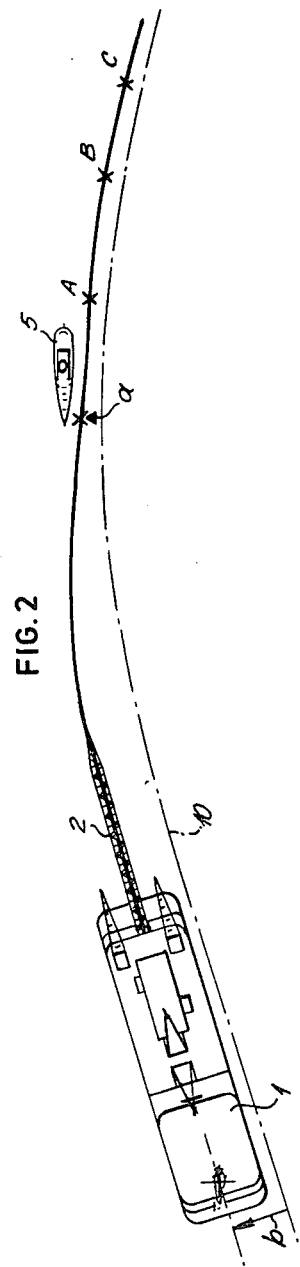
FIG. 2 is a schematic illustration of a pipe-laying operation in plan view.

FIG. 2 illustrates a pipe-laying operation in plan. It is normally intended to lay pipe along a predetermined path, in a region known as the right-of-way, and illustrated by the line 10 in FIG. 2. At any time the touch-down point X will normally be laterally displaced, by the various distance $a$, horizontally from the path 10. If the pipe-laying barge 1 is driven so as to be exactly over the path then normally the touch-down point will be laterally displaced considerably from the path owing to the various forces acting on the flexible pipeline and may lie outside the right-of-way.

Figure 3:
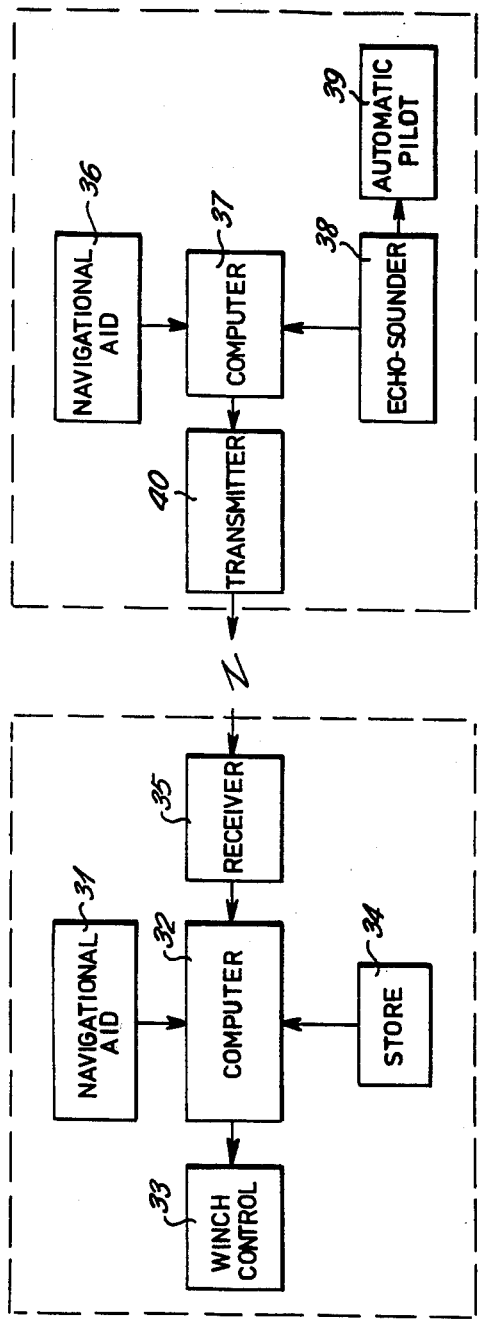
FIG. 3 is a schematic illustration of apparatus which may be incorporated on the pipe-laying barge and the survey vessel.

FIG. 3 illustrates the equipment which may be employed on the two vessels for performing the present invention. To a very great extent the equipment which is used is, as indicated hereinbefore, known and commercially available and is readily adaptable as necessary for performing the invention. On the pipe-laying barge is, in this embodiment, a navigational aid 31, a computer 32, a winch control 33, a store 34 and a receiver forming one end of the data link. The navigational aid, which may be any navigational aid suitable for the purpose, provides an indication of the actual geographical coordinates of the pipe-laying barge. Normal latitude and longitude or known alternative grid systems may be used. The store holds indications of the point to point progression of the path 10 in the right-of-way. The store may be in the form of a chart which has the path marked on it and in this case the computer includes an automatic reader by means of which the future progression of the path can be ascertained, but the path may be stored in the form of a magnetic tape containing the coordinates of the path at appropriate spaced intervals. The computer is disposed to provide appropriate command signals to the winch control 33 so as to cause the movement of the barge in the direction of progression of the path, when laying pipe. The dispostion and programming of the computer for this purpose and the arrangement of the winch control and the store may be in accordance with known practice.

Also illustrated in FIG. 3 is the equipment on the survey vessel. This equipment includes a navigational aid 36 and a computer 37. It will be appreciated that, if desired, the computation which is described herein as taking place on the barge may in fact be effected by means of the computer 37 on the survey vessel, in which case the vessel has a store of the point to point progression of the path 10. Further the navigational aid 36 may be absent provided that there is means on the pipe-laying vessel or elsewhere for determining the actual position of the survey vessel accurately enough.

The survey vessel includes an echo sounder which is arranged to ascertain the touch-down point of the pipeline and its geographical position relative to the geographical position of the survey vessel. For this purpose the data provided by the echo sounder is appropriately processed in the computer which provides indications of the successive determinations of the touch-down point so as to provide a control for an automatic pilot 39 for the vessel, which is disposed to maintain the survey vessel on a course in station above or near the touch-down point. The system is preferably arranged to make a determination of the position of the touch-down point at spaced times, so as, at those times, to enable the lateral displacement of the touch-down point from the path 10 to be determined. In this embodiement the determination is made by the computer 32 on the barge which receives data defining the touch-down point positions by means of a transmitter 40 on the vessel and a receiver 35 on the barge. However, as mentioned hitherto, the computation of the displacement may if desired be wholly made by the computer 37 on the survey vessel.

Thus at each of a succession of times, the computer 32 will have available an indication of the actual displacement of the pipe-laying barge from the path 10 and an indication of the actual deviation of the touch-down point from the path 10. It is a straightforward albeit complex matter to programme the computer 32 to provide to the winch control 33 command signals which reduce the aforementioned deviation. It may be provided that the permissible alteration to the lateral displacement of the pipe-laying barge relative to the right-of-way may be limited in any cycle of operation. This provision is a matter of choice of convenience. Normally however the programme will be such as to reduce the lateral displacement of the pipe-laying barge from the path 10 in the same sense as is necessary to reduce the lateral displacement of the touch-down point from the path towards zero.

In the above described example, the survey vessel 5 is kept in station above the touch-down point 6. However, as pipe is laid only relatively slowly, it may be difficult and in some conditions impossible to hold the position of the vessel 5 at such slow speeds. Thus, in a different example the vessel 5 is repeatedly driven along the already laid pipeline from behind the touch-down point and the location of the vessel 5 when over the point at which the pipe appears to lift off the sea bed, as detected by the echo sounder 38 is recorded. In this way, the geographical position of the touch-down point is determined at the time when the survey vessel passes above it. Having identified and determined the touch-down point position, the survey vessel 5 is then driven away from the pipeline and back again to a point above the already laid pipeline behind the touch-down point for another run. During the runs along the already laid line, the actual position of the laid pipe may also be logged, thus accounting for possible movements of the laid pipe on the bottom.

It has been found useful to use an automatic pilot when controlling the survey vessel 5 when it is driven along the pipeline to provide sufficiently fine control of the vessel and so that the vessel is controlled to run along an absolute geographical track, irrespective of the effects of wind, waves and current. The successively ascertained touch-down point positions may be stored in the computer 37 and employed to define the track of the laid pipe which the automatice pilot controls the vessel to follow.

Because most of the equipment that has been described must in any event be incorporated on the pipe-laying barge and the survey vessel as a matter of course in order to provide appropriate monitoring of the operation of pipe-laying, the present invention can be put into practice quite conveniently merely by an alteration of the programme which controls the operation of the pipe-laying barge. The method described has the significant advantage that the positioning of the barge is controlled automatically to take into account the local marine conditions without requiring an exact determination thereof and it facilitates an accurate laying of the pipeline.

It will be appreciated that any form of pipe laying vessel may be employed in the invention. Further, a fixed stern ramp is not necessary, and any other method for apparatus for launching pipe may be used. Any form of accoustic sensing device may be employed provided it is capable of locating the Touch Down Point with sufficient accuracy.

We claim:

1. A method of laying pipeline offshore, comprising driving a pipe-laying barge along a predetermined right-of-way, feeding a continuous length of pipe from the barge to the underlying marine bottom so that the pipe is laid approximately along a predetermined path in the right-of-way, driving a vessel substantially over and along the track of the pipe as laid, ascertaining, by means of an echo sounder, the position of the touch-down point of the pipeline, computing the lateral deviation of the touch-down point from the predetermined path, and controlling the lateral displacement of the pipe-laying barge in accordance with the computed deviation of the touch-down point from the path so as to reduce the aforementioned deviation.

2. A method as claimed in claim 1 wherein the vessel is repeatedly driven along the track of the pipe as laid from a point behind the touch-down point until the vessel passes over the touch-down point, whereupon the position of the touch-down point is ascertained, and thereafter driven back again behind the touch-down point to start a fresh run.

3. A method as claimed in claim 1 wherein the position of the touch-down point is ascertained by ascertaining the geographical or grid coordinates of the vessel when it is immdediately above the touch-down point as indicated by the echo sounder.

4. A method as claimed in claim 1 wherein the lateral deviation of the touch-down point from the predetermined path is computed by storing an indication of the path and computing the deviation of the position of the touch-down point as ascertained by the echo sounder from this stored path.

5. An offshore pipe-laying system comprising a pipe-laying barge including means for feeding a pipeline off of the barge to the sea bed, a system of anchors, a system of winches, and an automatic control apparatus for controlling the operation of the winches in accordance with input data so as to propel the barge as the pipeline is fed off of the barge to a touch-down point on the sea bed; means for storing an indication of a predetermined path in the right-of-way for a pipeline; a vessel which includes means capable of guiding the vessel along a course; an echo sounder on said vessel, the echo sounder being arranged to obtain data to ascertain the touch-down point of the pipeline being fed off of said barge; an automatic computing apparatus which is arranged to obtain an indication of the deviation of the touch-down point as detected by the echo sounder from said predetermined path and data transfer means having portions thereof on each of said barge and said vessel for transferring data from said vessel to said barge to provide an input for said automatic control apparatus on said barge which is a function of said deviation indication from said computing apparatus to control the automatic winch control apparatus of the pipe-laying barge to propel the pipe-laying barge in a direction to reduce the aforementioned deviation.

6. An offshore pipe-laying system as claimed in claim 5 wherein the pipe-laying barge includes a navigational aid which is capable of providing an indication of the geographical coordinates of the pipe-laying barge.

7. An offshore pipe-laying system as claimed in claim 5 wherein the indication of the predetermined path in the right-of-way consists of a storage of a multiplicity of geographical locations which the path traverses.

8. An offshore pipe-laying system as claimed in claim 5 wherein the vessel includes a navigational aid and means for determining the geographical coordinates of the vessel and the geographical coordinates of the touchdown point.

9. An offshore pipe-laying system as claimed in claim 5 wherein said data transfer means comprises a radio link between the vessel and the pipe-laying barge for transmitting data relating to the touch-down point ascertained by the echo sounder to the barge for use in controlling the automatic winch control apparatus.

10. An offshore pipe-laying apparatus as claimed in claim 9 wherein the radio link is arranged to transmit data defining the ascertained touch-down points and the automatic computing apparatus is on the barge.

* * * * *